United States Patent [19]
Berlincourt et al.

[11] Patent Number: 4,915,762
[45] Date of Patent: Apr. 10, 1990

[54] PROCESS FOR MAKING A HIGH-PRESSURE HOSE

[75] Inventors: Yves Berlincourt, Blois; Alain Mouchot, Cheverny, both of France

[73] Assignee: Tecalemit Flexibles, S.A., Blois, France

[21] Appl. No.: 95,091

[22] Filed: Sep. 10, 1987

Related U.S. Application Data

[62] Division of Ser. No. 38,884, Apr. 14, 1987, Pat. No. 4,802,510.

[30] Foreign Application Priority Data

Apr. 18, 1986 [FR] France ................... 86-05629

[51] Int. Cl.⁴ .............................................. B31C 1/00
[52] U.S. Cl. ......................................... 156/143; 87/9;
156/149; 156/161
[58] Field of Search ........................... 156/143–144,
156/148–149, 161, 172; 138/124, 125, 126, 153;
87/9

[56] References Cited

U.S. PATENT DOCUMENTS 3,062,241 11/1962 Brumbach .................. 138/126 X
3,905,398 9/1975 Johansen et al. ................ 138/124
4,273,160 6/1981 Lowles ............................. 138/124
4,343,333 8/1982 Keister ............................. 138/125
4,384,595 5/1983 Washkewicz et al. ...... 138/125 X
4,452,279 6/1984 Atwell ............................. 138/126
4,567,917 2/1986 Millard ............................ 138/126

Primary Examiner—David Simmons
Assistant Examiner—David William Herb
Attorney, Agent, or Firm—Mason, Fenwick & Lawrence

[57] ABSTRACT

The invention relates to a hose comprising an inner plastic tube (2) covered by at least one braiding of filaments disposed in helically crossed layers (5, 6) around the inner tube (2), characterized in that the filaments (7) are made of plastics and are so deformed in their right cross-section that the gap (8) between any two adjacent layers (6a, 6b) which extend in the same direction as one another is at least 100% filled. The invention also relates to a process for the production of the hose.

16 Claims, 2 Drawing Sheets

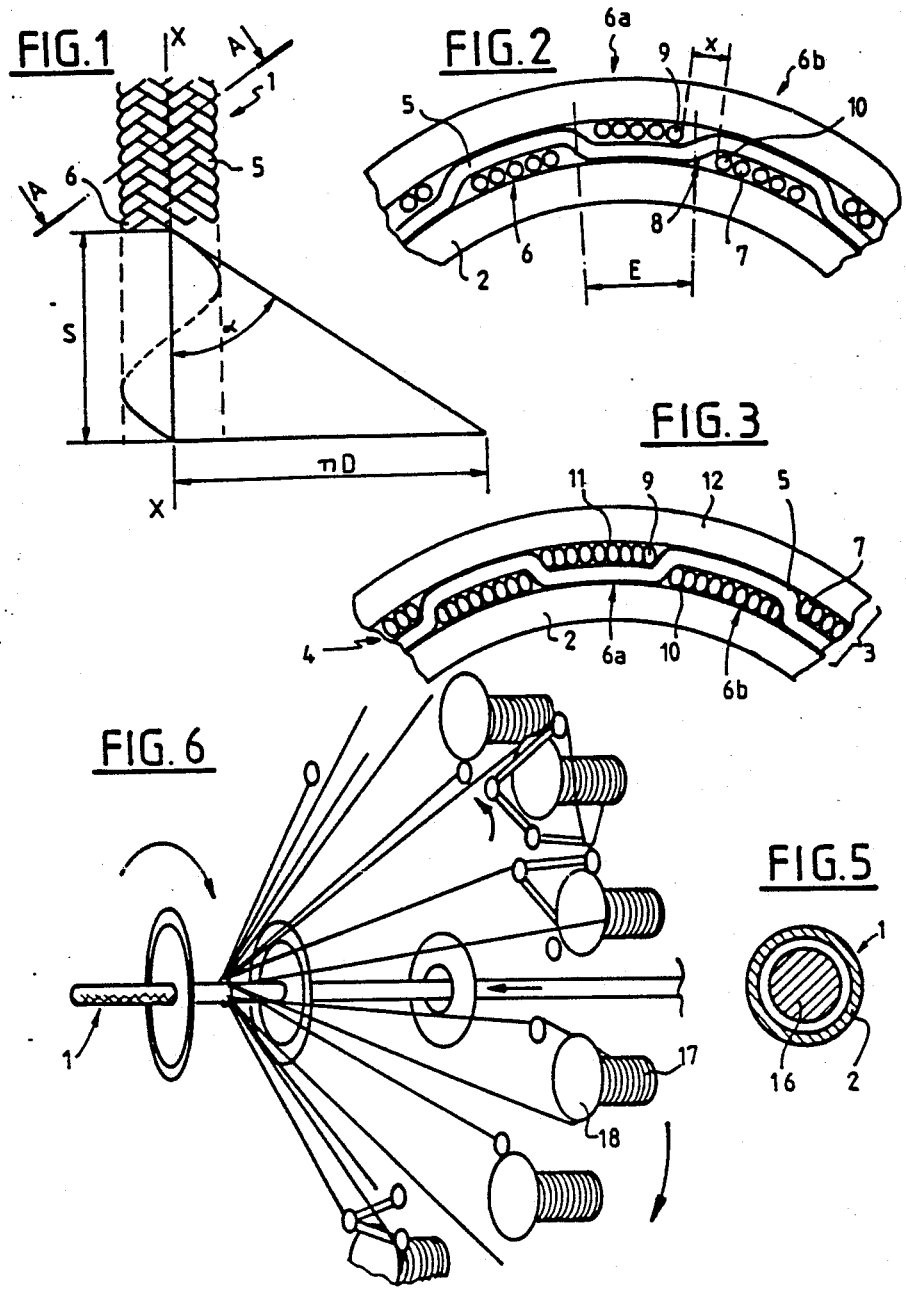

PROCESS FOR MAKING A HIGH-PRESSURE HOSE

This application is a division of application Ser. No. 38,884, filed Apr. 14, 1987, now U.S. Pat. No. 4,802,510.

BACKGROUND AND OBJECTS OF THE INVENTION

This invention relates to a novel very high-pressure hose with high dynamic endurance, the hose being strengthened by synthetic fibre filaments and being of use to carry fuels, gases and hydraulic fluids.

High-pressure hoses comprising a tube covered by an axial outer cylindrical element produced by braiding a number of filaments are known. Each set of filaments is wound spirally on the tube. For example, metal wires having a diameter of from 0.3 to 0.6 mm are used for braiding. However, the wires, since they are placed spirally on the tube by braiding, experience alternate bending when used at very high pressure and this alternate bending may break the wires. Also, since braiding bends the wires, with the possible result of them breaking and of the inner tube being perforated, it is preferred to layer filaments placed one above another.

To ensure that the hose is strong enough to carry high-pressure fluids, efforts have been made to minimise the gap in the braided element between the layers of braided metal wires. Layers of coplanar steel wires do not allow adequate filling and holes and voids remain between two contiguous layers, with the result that the hose has less strength to withstand high pressures. Improvements have been made to the conventional braiding of steel wires in coplanar layers and groups of non-coplanar fine wires have been braided to provide better filling (French patent specification 1 522 053). Unfortunately, the resulting hoses are heavy since the amount of material placed on the central tube is greater when groups of fine wires are braided than when layers of wires are braided.

It is the object of the invention to obviate these disadvantages.

It is a first object of the invention to provide hoses comprising a central tube covered by braided synthetic fibre filaments, the braiding providing a gapless covering surface and thus making it possible to provide the hose with very good high-pressure strength.

It is a second object of the invention to provide hoses having a long working life in respect or mechanical stresses and without any limitation of the materials used for the hoses.

It is a third object of the invention to provide hoses which for a given strengths are lighter than the known hoses and which are not fatigued by alternate bending and which withstand corrosion, abrasion, heat, chemical agents and ultraviolet radiation.

The invention accordingly relates to a hose comprising an inner plastic tube covered by a braiding of filaments disposed in helically crossed layers around the inner tube, the hose being such that the filaments are made of plastic and are so deformed in their right cross-section that the gap between any two adjacent layers which extend in the same direction so one another is at least 100% filled.

Preferably, the plastic is aromatic polyamide such as KEVLAR or TWARON, the registered trade marks of the Du Pont de Nemours and Enka companies respectively.

The invention also relates to a process for producing such a hose.

BRIEF DESCRIPTION OF THE FIGURES

The following description taken together with the accompanying exemplary non-limitative drawings will show how this invention can be carried into effect. In the drawings:

FIG. 1 is an elevation of a piece of hose according to the invention;

FIG. 2 is a partial view to an enlarged scale and in inclined section of a prior art hose;

FIG. 3 is a partial view to an enlarged scale, in section on the line A—A of FIG. 1, of a first embodiment of a hose according to the invention;

FIG. 5 is a view in right cross-section of a hose according to the invention during its production, and FIG. 6 is a diagrammatic view of the apparatus for the practice of the process for manufacturing a hose according to the invention.

DETAILED DESCRIPTION OF A PREFERRED EMBODIMENT

Figure 4:
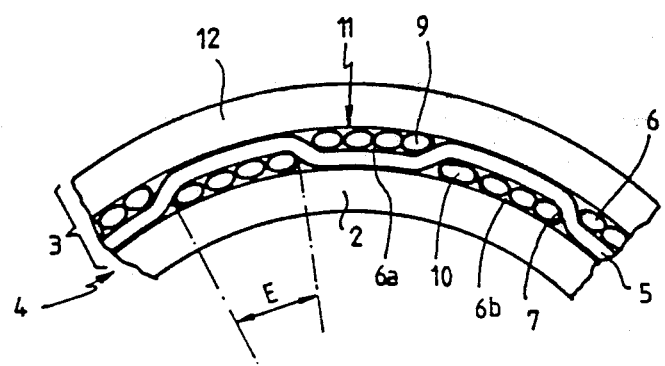
FIG. 4 is a partial view to an enlarged scale along the line A—A of FIG. 1 of a second embodiment of a hose according to the invention.

A hose 1 according to the invention comprises at least one inner tube 2 and an outer member 3 embodied by braided filaments. Each braiding 4 is formed of layers 5 of helically wound filaments which cross helically wound layers 6, the layers 5, 6 making the same angle α, called the braiding angle, with longitudinal axis X—X of hose 1. If D denotes the braiding diameter (defined as the average diameter of the braiding or diameter of the neutral fibre) and S denotes the length of the pitch, then:

$$tg\, \alpha = \frac{\pi D}{S}$$

Also, if E denotes the width of a gap 11 for a layer 5 or 6 between two crossings with another layer 6 or 5 and N denotes the total number of layers 5, 6 wound around the tube 2, then:

$$E = \frac{2\pi D \cos\alpha}{N}$$

In the prior art metal wires 7 (FIG. 2), for example, of steel, are used—i.e., the wires are incompressible and the right cross-section thereof is and remains circular. The metal wires 7 of layer 5 when placed one beside another in the same layer cannot completely fill the gap E left by the inversely braided layer 6. Consequently, if each layer 5, 6 consists of wires disposed parallel to one another and one beside another, there always exists a gap 8, of a width x called the clearance, which is necessary for the flexibility of the hose when metal wires are used, between the last wire 9 of a layer 6a and the first—i.e., nearest—wire 10 of the adjacent layer 6b which extends in the same direction. The inner tube 2 is therefore weakened, near the gap 8.

The invention therefore resides in obviating the gaps 8 between two layers 6a, 6b of filaments which are adjacent with one another and which extend in the same direction as one another but without making the hose rigid.

The invention therefore proposes a hose embodied by a plastic inner tube 2 covered by at least one braiding of filaments disposed in layers 5, 6 crossed helically around the inner tube 2 wherein the filaments 7 are made of plastics and are so deformed in their right cross-section that the gap 8 between any two adjacent layers 6a, 6b which extend in the same direction as one another is at least 100% filled.

At least 100% filled means that the volume of the filaments constituting the layer prior to braiding them on the inner tube is equal or superior to the volume of the annular sheet they will finaly constitute when they are braided on the inner tube. The deformation by compression of the filaments permits this feature.

In the first embodiment, shown in FIG. 3, the number n of filaments per layer 5, 6, the number N of layers 5, 6 around the inner tube 2, the filament gauge t and the tension T with which they are laid are such that the width E of the gap 11 for a layer 5, 6 of n filaments 7 is less than the space normally required thereby, the filaments being disposed one beside another, squeezed against one another and flattened in a direction substantially radially of the inner tube (2).

The point is that the gauge t corresponds to an average diameter d of the filaments 7 and, if the filaments 7 are assumed to be non-deformable and of circular cross section, then:

$$x = E - nd$$

In this first embodiment of the invention, n, N and t (and therefore d) are so chosen that $$E - nd < 0.$$

The tension T is therefore adapted to produce the distortion of the filament 7 and their arrangement one beside another as shown in FIG. 3 while obviating any placing of the filaments one above another.

In the second embodiment of the invention, shown in FIG. 4, the number n of filaments 7 per layer 5, 6, the number N of layers 5,6 around the inner tube 2, the filament gauge t and the tension T with which they are laid are such that the width E of the gap 11 for a layer 5, 6 of n filaments 7 is greater than the space required thereby, the filaments being flattened in a direction substantially tangentially of the inner tube 2 to completely fill the gap 11 and the gap 8 between any two adjacent layers 6a, 6b which extend in the same direction as one another.

In this second embodiment of the invention:

$$E - nd > 0.$$

However, the tension T is sufficient to deform the filaments 7 and completely fill the gap 11.

In all cases each filament 7 has a right cross-section which is other than circular and which is flattened, being notably substantially elliptical.

A braiding 4 of a hose 1 according to the invention is embodied by filaments placed one beside another in layers but deformed transversely so that the last filament 9 of the layer 6a is beside—i.e., without any gap—the first filament 10 of the adjacent layer 6b which extends in the same direction as the layer 6a, although the layers extend in two different parallel planes, one such plane being above the filaments of the inversely braided layer 5 while the other plane is below the filaments thereof. The filaments 7 can be sufficiently deformed for the last filament 9 of a layer to be placed substantially above the first filament 10 of the next layer. The gap between two layers is therefore more than 100% filled.

The first embodiment of the invention is well suited to hoses having a relatively large diameter D of, for example, more than 10 mm and having a substantial number n of filaments 7 per layer, for example, having more than four filaments and possibly, conventionally, as many as twelve.

However, the second embodiment of the invention is better suited to hoses having a relatively reduced diameter D of, for example, less than 10 mm and having a smaller number n of filaments 7 per layer, for example, at most four filaments per layer.

The filaments 7 which form at least the inner braiding 4 in engagement with the inner tube 2 are embodied by synthetic fibres, the filaments being twisted so that the fibres acquire after spinning a high breaking strength. As a rule, the maximum breaking strength of a steel wire of from 0.3 to 0.6 mm in diameter is between 245 and 275 da N/mm$^2$. According to the invention, filaments of twisted synthetic fibres, for example with a twist of 80 turns per meter run, and having for the same diameter a breaking strength of the order of 280 da N/mm$^2$ are used.

The synthetic fibres are preferably aromatic polyamide fibres having a high elasticity modulus, such as KEVLAR, a registered trade mark of Du Pont de Nemours or TWARON, a registered trade mark of Enka. The fibres used for the filaments 7 are, with advantage, impregnated with a fluorinated polymer operative for chemical and mechanical bonding of the fibres.

The hose 1 according to the invention can be embodied by a hollow inner tube 2 made of polytetrafluoroethylene which may or may not be internally lines with a carbon layer in order to be electrically conductive or not.

Preferably, the hose according to the invention comprises at least one braiding 4 of filaments 7 and means 12 for protecting the braiding 4 against external stressing including mechanical, heat, chemical and radiation stressing.

In a first possible variant, the protective means 12 comprise a plastic sheathing, for example of synthetic fluorinated polymer, covering the or each braiding 4. Sheathing of this kind is completely hermetic.

In a second possible variant, the means 12 comprise an outer protective braiding around the or each reinforcing braiding 4. The outer protective braiding 12 is made of highly abrasion-resistant plastic operative as heat insulant and unaffected by ultraviolet radiation, for example of aromatic polyamide such as NOMEX, a registered trade mark of Du Pont de Nemours, which has a dark or reflecting colour for better ultraviolet protection. A substance such as NOMEX provides excellent fire protection and withstands temperatures up to 200° C. Also, it is very light and flexible. Advantageously, the outer protective braiding 12 has the same features as the strengthening braiding 4—i.e., the filaments are transversely deformed to completely fill the gap between two adjacent layers which extend in the same direction as one another.

In a third possible variant, the hose 1 comprises only one braiding 4 of filaments 7 and the same are embodied by or covered by a substance treated to withstand external stressing to form protective means 12.

Preferably, the filaments 7 of the outer braiding 4 or 12 are embodied by or covered by a non-wetting substance.

Only a single strengthening braiding 4 is provided in such embodiments of the invention as are illustrated. However, a number of identical braidings 4 can be arranged one above another and each covered by protective means 12. For instance, two identical braidings 4 can be provided one above another, the braiding angles being very close to one another at 54° and 55° respectively.

The invention also proposes a process for the production of a hose 1 comprising an inner plastic tube 2 and at least one braiding 4 of filaments 7 wound in layers 5, 6 helically around the inner tube 2, characterised in that the layers 5, 6 of plastics filaments 7 are braided; by the filaments 7 being stretched enough to deform their right cross-section and to position them side by side in the same layer, adjacent layers 6a, 6b which extend in the same direction as one another being positioned without tangential clearance.

In a production process according to the invention, the layered filaments 7 are first wound on reels 17, whereafter the inner tube 2 is threaded on to a former 16, whereafter the filaments 7 are braided or stranded by means of the braiding or stranding device shown in FIG. 6 where the braiding reels 17 containing the layered filaments 7 are disposed.

In a process according to the invention, therefore, the following steps are carried out:

(a) Filaments 7 made of synthetic fibres are first wound on reels 7, the filaments being disposed one beside another in layers on each reel;
(b) The inner tube 2 is threaded onto a mandrel;
(c) The filaments 7 are braided by so adjusting their tension as to stretch them and deform their cross-section;
(d) The filaments 7 are so braided that each last filament 9 of a layer 6a is positioned beside the first filament 10 of the immediately adjacent layer 6b which extends in the same direction.

To produce a hose 1 of the first embodiment shown in FIG. 3, the number N of braiding reels 17 of the braiding or stranding apparatus (which corresponds to the number N of layers 5, 6 forming the braiding 4 around the inner tube 2), the number n of filaments 7 per layer 5, 6, the filament gauge t and the tension T with which the filaments 7 are braided are so chosen that the width E of the gap 11 for a braided layer is less than the space normally required by the n filaments 7 of the layer 5, 6, the n filaments 7 remaining one beside another during braiding, being squeezed together and flattened in a direction substantially radially of the inner tube 2.

To produce a hose 1 of the second embodiment shown in FIG. 4, the number N of braiding reels (and hence the number of layers 5, 6 forming the braiding 4 around the inner tube 2), the number n of filaments 7 per layer 5, 6, the filament gauge t and the tension T with which the filaments 7 are braided are so chosen that the width E of the gap 11 for a braided layer is greater than the space normally required by the n filaments 7 of the layer 5, 6, the n filaments 7 remaining one beside another during braiding and being flattened in a direction substantially tangentially of the inner tube 2 to completely fill the gap 11 left for the n filaments 7 and the gap 8 between any two adjacent layers 6a, 6b which extend in the same direction as one another.

Preferably, the step of winding the layered filaments 7 on the reels 17 is carried out after spinning and after the filaments 7 have been given a type 5 twisting for example of 80 turns per meter run.

In the reeling operation the filament layers 7 are reeled on reels 17 having end plates 18 operative to retain the filaments 7 when they experience elevated tension during the subsequent braiding step.

The filaments 7 experience an elevated tension T, possibly of the order of from 9 to 14 daN, during braiding. The tension T is sufficient to lock the inner tube 2 by mechanical seizure. The braiding filaments 7 are encrusted in the outside surface of the inner tube 2. Preferably, the inner diameter of the inner tube 2 is greater than the diameter of the former 16 so that the braiding applies the tube 2 to the former 16. With an elevated tension T the variation in hose length under stressing including pressure, temperature and bending can be reduced considerably, so that there is less disturbance in the hydraulic circuit and the connection of the union to the hose is stronger.

Before reeling the filaments are impregnated with a fluorinated polymer by being dipped in a bath during the twisting operation.

The inner tube 2 can also be lined with a number of braids 4 disposed one above another with very similar braiding angles close to the theoretical braiding angle of 54°44'. Preferably, a first braiding is made with a braiding angle of 54°, whereafter a second braiding is made with a braiding angle of 55°.

If the filaments 7 have not themselves been previously protected, a protective covering 12 is placed on the or each braiding after the braiding step. The covering 12 is either an extruded sheath, for example, of fluorinated synthetic polymer or a further braiding of a different material from the strengthening braidings 4, for example, of coloured NOMEX.

EXAMPLE 1

A hose was made by braiding 3340 dtex filaments—i.e., filaments having an average diameter d of 0.47 mm—on an inner tube. The filaments were first wound in a layer of n=6 filaments and a braiding machine having N=36 reels was used. The inner tube diameter was such that the diameter D of the neutral fibre was 19.4 mm. The braiding angle α was 54°44'. The tension T was 14 daN.

EXAMPLE 2

A hose was made by braiding 3340 dtex filaments—i.e., filaments having an average diameter d of 0.47 mm—on an inner tube. The filaments were first wound in a layer of n=2 filaments and a braiding machine having N=24 reels was used. The inner tube diameter was such that the diameter D of the neutral fibre was 8.9 mm. The braiding angle α was 54°44'. The tension T was 10 daN.

The resulting hoses withstand temperatures in a range extending from −55° C. to +180° C. and are unaffected by oils, air and fuel, for example, at 180° C. for 7 days.

When pressure tested at from 280 to 420 bar—i.e., at 50% overpressure-variation in hose length was at most 2%.

We claim:
1. A process for the production of a hose comprising an inner plastic tube covered by at least one braiding of plastic filaments which are helically crossed around the inner tube in two different directions, wherein said plastic filaments are braided by the filaments being helically crossed around the inner tube in two different directions so that the gap between any two adjacent layers which extend in the same direction as one another is at least 100% filled by braiding said filaments with sufficient tension to stretch said filaments so that on application of said filaments to said inner tube, said filaments are flattened in a direction substantially tangentially against said tube, and deformed out of their circular right cross-section.

2. A process according to claim 1, wherein the following steps are carried out:
   (a) filaments made of synthetic fibers are first wound on reels, the filaments being disposed one beside another in layers on each reel;
   (b) the inner tube is threaded onto a mandrel;
   (c) the filaments are braided by so adjusting their tension as to stretch them and deform their right cross-section;
   (d) the filaments are so braided that each end filament of a layer is positioned beside the first filament of the immediately adjacent layer which extends in the same direction; and wherein the number N of braiding reels and hence the number of layers forming, the braiding around the inner tube, the number n of filaments per layer, the filament gauge t and the tension T with which the filaments are braided are so chosen that the width E of the gap for a braided layer is less than the space normally required by the n filaments of the layer, thus satisfying the relation $E-nd<0$, where d is an average diameter of the filaments before they are braided, the n filaments remaining one beside another during braiding, being squeezed together and flattened in a direction substantially radially of the inner tube in order to completely fill the gap left for the n filaments and the gap between any two adjacent layers which extend in the same direction as one another.

3. A process according to claim 1, wherein the following steps are carried out;
   (a) filaments made of synthetic fibers are first wound on reels, the filaments being disposed one beside another in layers on each reel;
   (b) the inner tube is threaded onto a mandrel;
   (c) the filaments are braided by so adjusting their tension as to stretch them and deform their right cross-section;
   (d) the filaments are so braided that each end filament of a layer is positioned beside the first filament of the immediately adjacent layer which extends in the same direction; and wherein the number N of braiding reels and hence the number of layers forming the braiding around the inner tube, the number n of filaments per layer, the filament gauge t and the tension T with which the filaments are braided are so chosen that the width E of the gap for a braided layer is greater than the space normally required by the n filaments of the layer, thus satisfying the relation $E-nd>0$ where d is an average diameter of the filaments before they are braided, the n filaments remaining one beside another during braiding and being flattened in a direction substantially tangentially of the inner tube in order to completely fill the gap left for the n filaments and thee gap between any two adjacent layers which extend in the same direction as one another.

4. A process according to claim 3, wherein the plurality of filaments are reeled after spinning and after they have been given a twisting S, of 80 turns per meter run.

5. A process according to claim 3, wherein the filament layers are reeled on reels having end plates operative to retain the filaments when they experience elevated tension during the subsequent braiding step.

6. A process according to claim 3, wherein the filaments are impregnated before reeling with a fluorinated polymer by being dipped in a bath during the twisting operation.

7. A process according to claim 1, wherein a number of braidings are formed one above another and with very similar braiding angles, notably a first braiding with a braiding angle of 54°, then a second braiding with a braiding angle of 55°.

8. A process according to claim 1, characterized in that each braiding has a protective covering placed thereon.

9. A process for the production of a flexible hose comprising covering of an inner plastic tube by at least one braiding of plastic filaments which are helically crossed around the inner tube in two different directions, each layer being constituted of a single flat row of plastic filaments arranged in adjoining parallel relation, wherein layers of plastic filaments are braided by helically crossing the plastic filaments around the inner tube in two different directins so that the gap between any two adjacent layers which extend in the same direction as one another is at least 100% filled by braiding said filaments with sufficient tension to stretch said filaments so that on application of said filaments to said inner tube, said filaments are disposed one beside another and squeezed against one another and flattened in a direction substantially radially of the inner tube out of their circular right cross-section.

10. A process according to claim 9 wherein each filament is stretched during braiding to have an elliptical right cross-section.

11. A process for the production of a flexible hose according to claim 9, wherein said plastic filaments are aromatic polyamide and are braided with a tension T superior to 9 daN so that the filaments are deformed in the right cross-section.

12. A process according to claim 11, wherein the tension T is of the order of 10 daN for an inner tube diameter D of the order of 10 mm.

13. A process according to claim 11, wherein the tension T is of the order of 14 daN for an inner tube diameter D of the order of 20 mm.

14. A process according to claim 9 for the production of a flexible hose having an inner tube diameter D of more than 10 mm and having more than four filaments per layer, wherein the number of layers forming the braiding around the inner tube, the number n of filaments per layer, the filament gauge t and the tension T with which the filaments are braided are so chosen that the width E of the gap for a braided layer is less than the space normally required by the n filaments of the layer, thus satisfying the relation $E-nd>0$ where d is an average diameter of the filaments before they are braided, the n filaments remaining one beside another during braiding, being squeezed together and flattened in a direction substantially radially of the inner tube in order to completely fill the gap left for the n filaments and the gap between any two adjacent layers which extend in the same direction as one another.

15. A process according to claim 1 for the production of a flexible hose having an inner tube diameter D of less than 10 mm and having at most four filaments per layer wherein the number of layers forming the braiding around the inner tube, the number n of filaments per layer, the filament gauge t and the tension T with which the filaments are braided are so chosen that the width E of the gap for a braided layer is greater than the space normally required by the n filaments of the layer, thus satisfying the relation $E-nd>0$ where d is an average diameter of the filaments before they are braided, the n filaments remaining one beside another during braiding and being flattened in a direction substantially tangentially of the inner tube in order to completely fill the gap left for the n filaments and the gap between any two adjacent layers which extend in the same direction as one another.

16. A process for the production of a flexible hose as defined in claim 1, wherein said plastic filaments are aromatic polyamide filaments.

* * * * *